H. S. BECHTEL.
CAN SOLDERING MACHINE.
APPLICATION FILED DEC. 10, 1913.

1,104,767.

Patented July 28, 1914.
5 SHEETS—SHEET 1.

Witnesses
L. P. Moyer
C. R. Ziegler.

Inventor
Henry S. Bechtel
By Joshua R. H. Potts.
Attorney

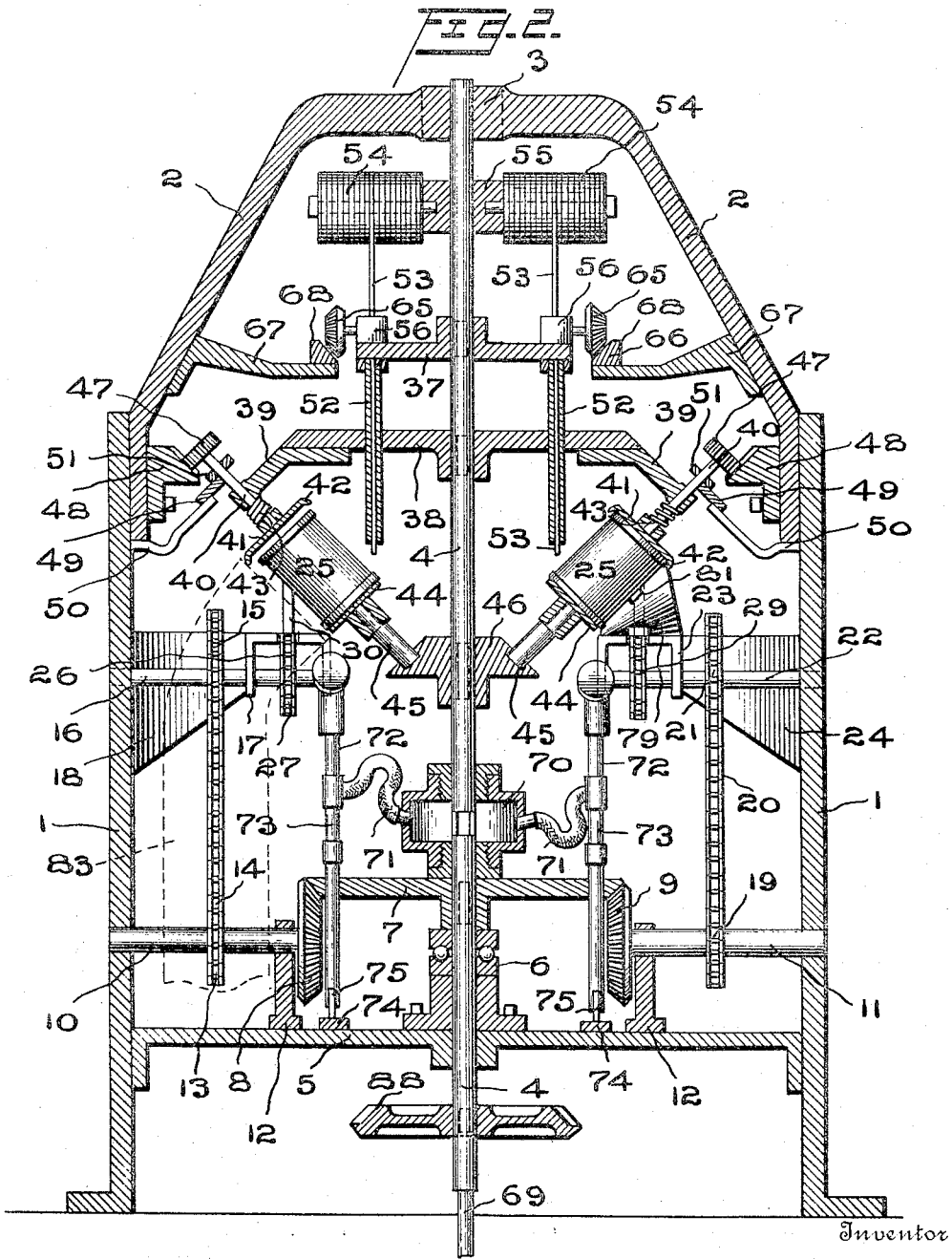

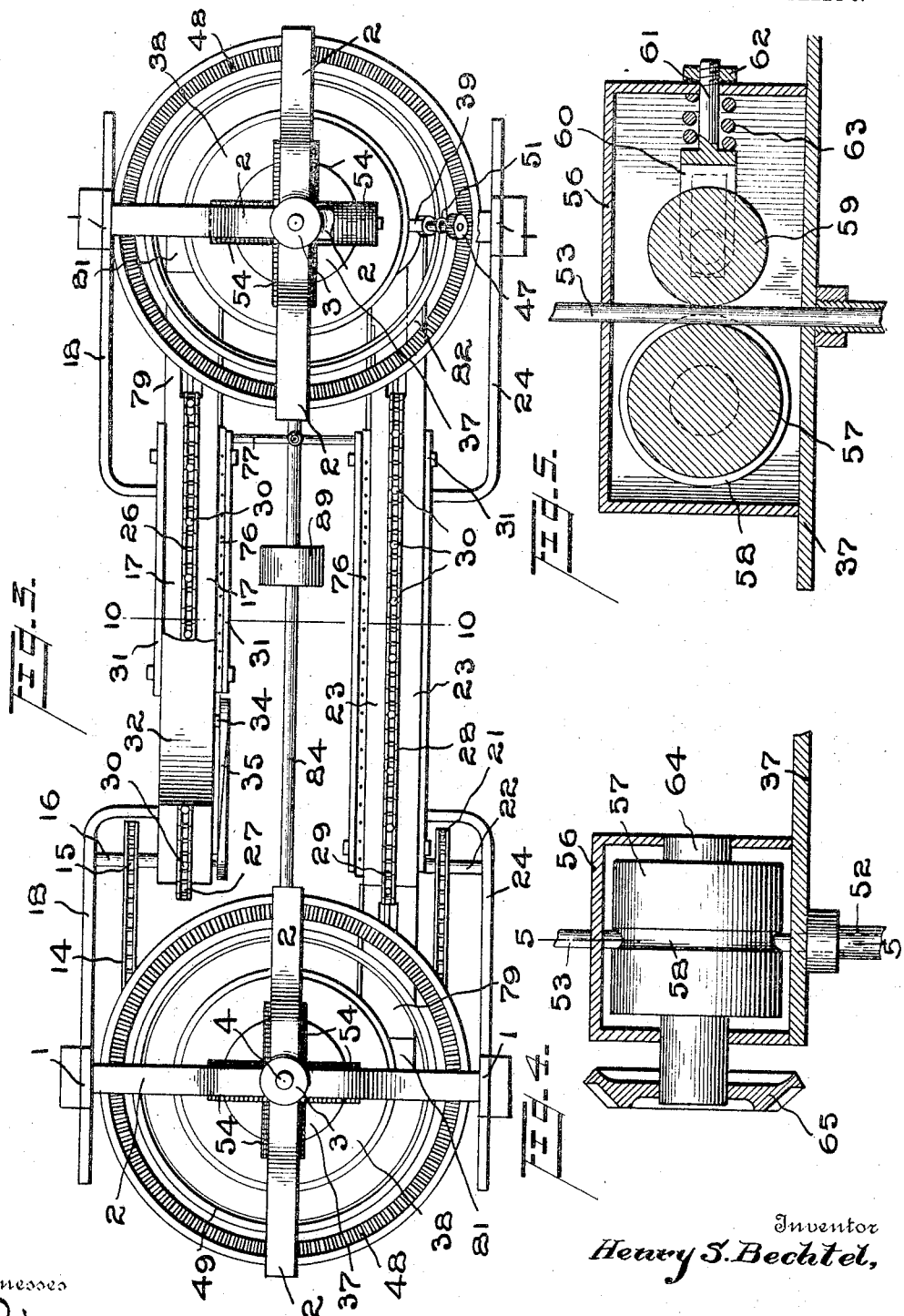

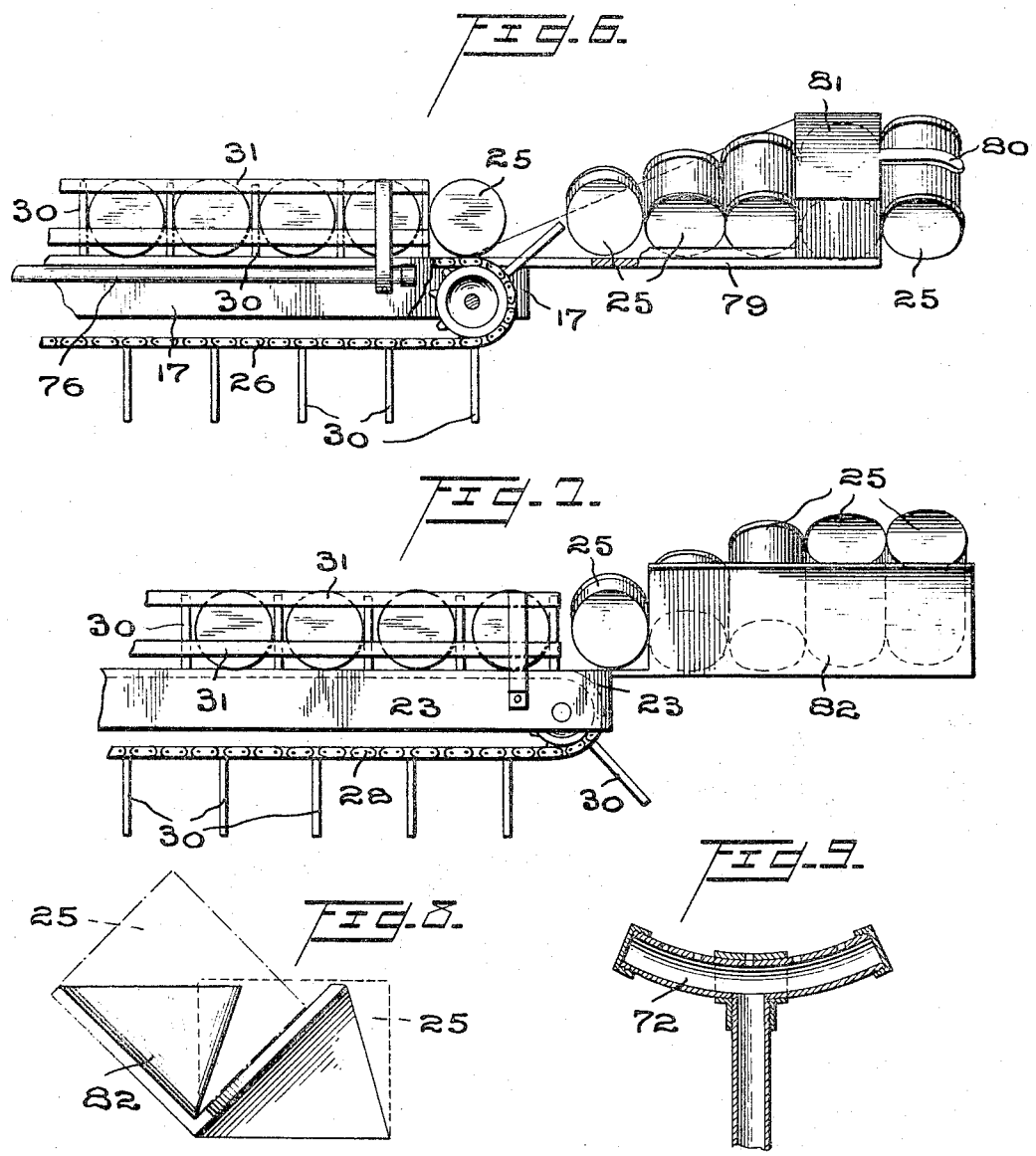

H. S. BECHTEL.
CAN SOLDERING MACHINE.
APPLICATION FILED DEC. 10, 1913.

1,104,767.

Patented July 28, 1914.
5 SHEETS—SHEET 5.

Witnesses
L. C. _____
C. R. Ziegler.

Inventor
Henry S. Bechtel
By Joshua R. H. Potts
Attorney

UNITED STATES PATENT OFFICE.

HENRY S. BECHTEL, OF PHILADELPHIA, PENNSYLVANIA.

CAN-SOLDERING MACHINE.

1,104,767. Specification of Letters Patent. Patented July 28, 1914.

Application filed December 10, 1913. Serial No. 805,684.

*To all whom it may concern:*

Be it known that I, HENRY S. BECHTEL, a citizen of the United States, residing at Philadelphia, in the county of Philadelphia and State of Pennsylvania, have invented certain new and useful Improvements in Can-Soldering Machines, of which the following is a specification.

My invention relates to improvements in can soldering machines, the object of the invention being to provide improved means for automatically soldering the heads on both ends of the can or in other words, provide what is known in the art as an improved floater.

A further object is to provide two can soldering mechanisms connected by an improved arrangement of conveyers, so that the cans may be moved to one soldering mechanism where the heads on one end of the cans are soldered and then said conveyers move the cans to the other soldering mechanism, during such last-mentioned movement reversing the position of the cans, so that the heads on the other ends of the cans are soldered by the last-named soldering mechanism.

With these and other objects in view, the invention consists in certain novel features of construction and combinations and arrangements of parts as will be more fully hereinafter described and pointed out in the claims.

Figure 1:
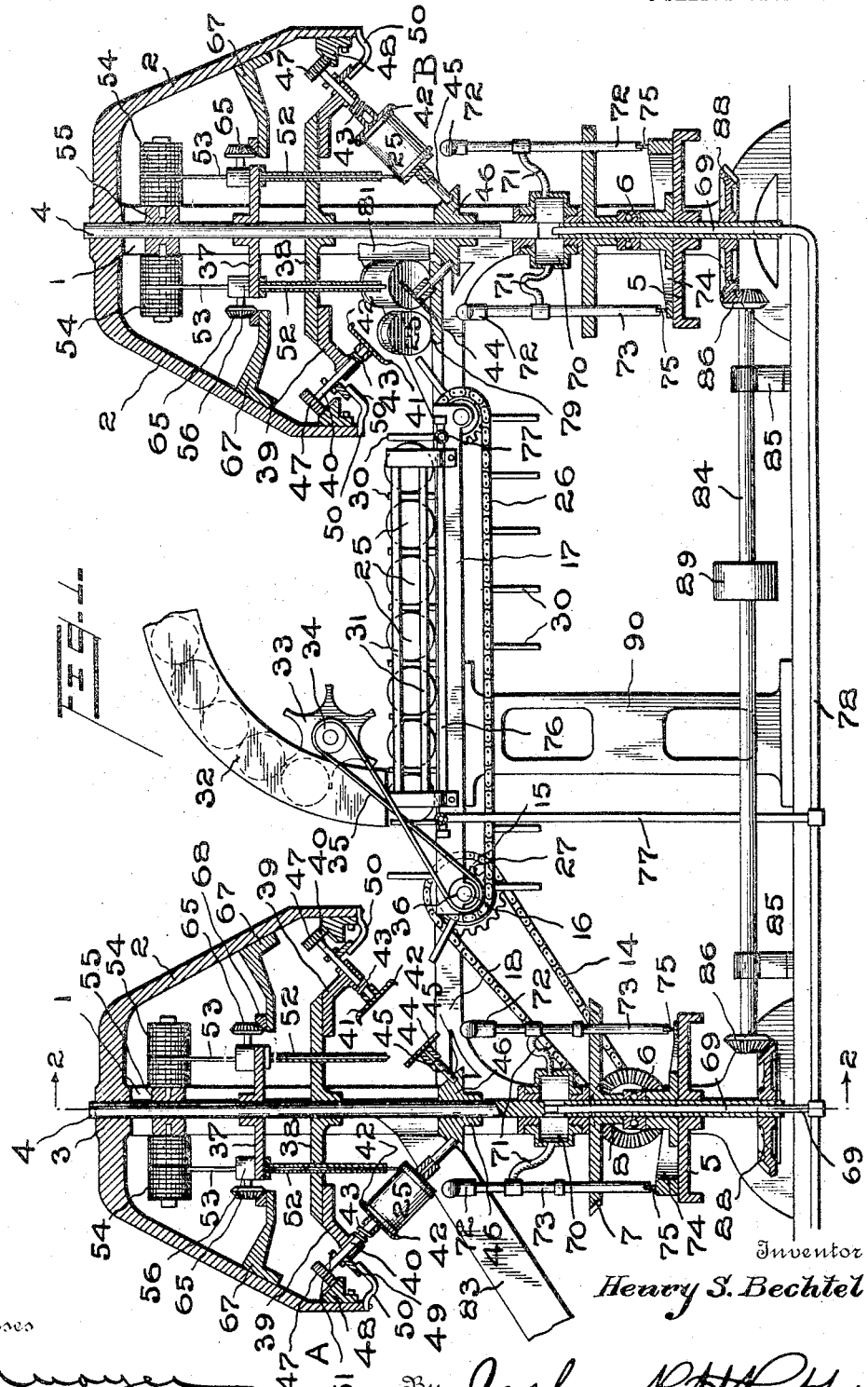
Figure 10:
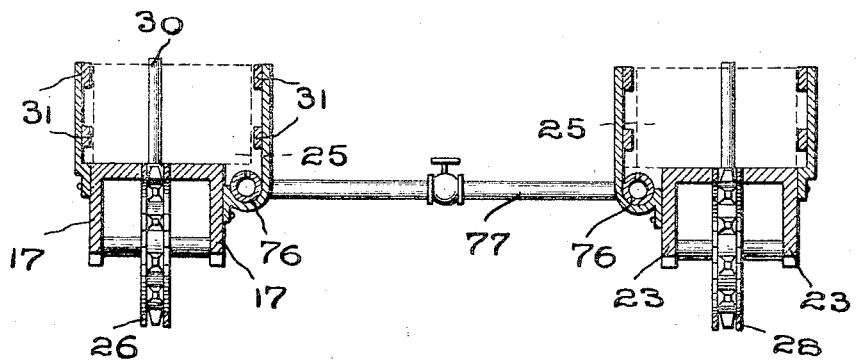
Figure 11:
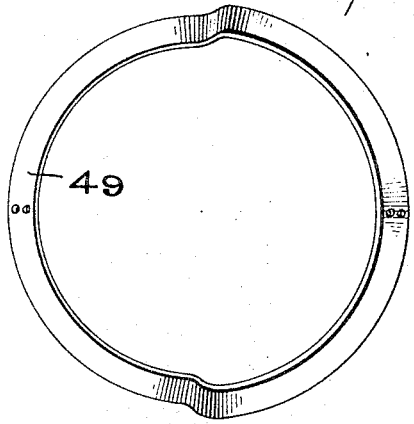
Figure 13:
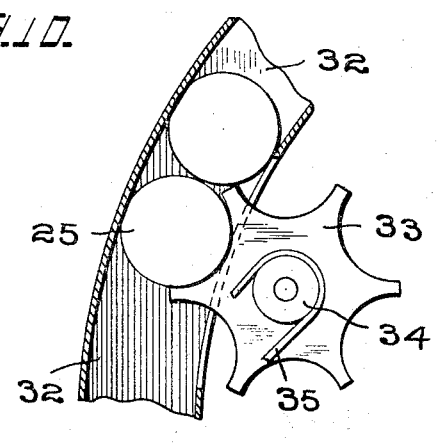
Figure 12:
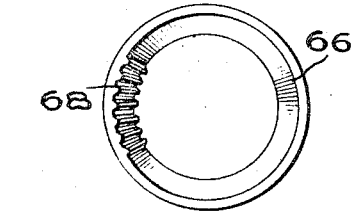
Figure 14:
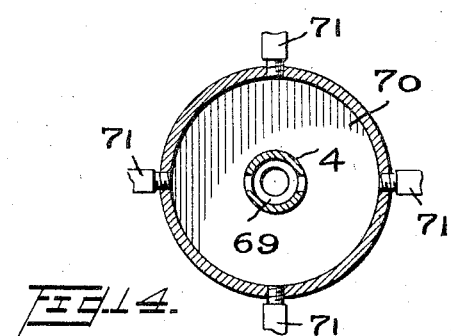

In the accompanying drawings: Figure 1 is a view in vertical longitudinal section illustrating my improved machine. Fig. 2 is a view in transverse section on an enlarged scale on the line 2—2 of Fig. 1. Fig. 3 is a plan view partly broken away. Fig. 4 is a view in section on an enlarged scale illustrating one of the solder feeding devices. Fig. 5 is a view in section on the line 5—5 of Fig. 4. Fig. 6 is a fragmentary view in elevation on an enlarged scale illustrating the means for feeding the cans in proper position to be grasped by the can holding clamps. Fig. 7 is a similar view illustrating the means for receiving the cans as they are deposited by the clamps. Fig. 8 is an end view of Fig. 7. Fig. 9 is a view in longitudinal section through one of the burners 72. Fig. 10 is a view in transverse section on an enlarged scale on the line 10—10 of Fig. 3, and Figs. 11, 12, 13, and 14, are views of various details of construction.

My improved can soldering machine embodies two soldering mechanisms A and B which are precisely alike and located at opposite ends of the machine, the description of one will apply alike to both. These soldering mechanisms are connected by an improved arrangement of conveyers which feed the cans to the mechanisms so that one mechanism serves to solder one head or end and the other mechanism serves to solder the other head or end of the can.

Each soldering mechanism is provided with two standards 1, 1, located in parallelism as shown clearly in Fig. 2, and connected at their upper ends by a frame 2 having a central bearing 3 supporting the upper end of a vertical shaft 4. The lower end of this vertical shaft 4 extends through a table 5 fixed to the standards 1 and supporting a ball bearing 6. A relatively large beveled gear 7 is secured to the shaft 4 and rests upon the bearing 6, and this gear 7 meshes with two beveled gears 8 and 9 respectively, the latter secured to relatively short horizontal shafts 10 and 11 respectively, which latter are supported in brackets 12 and in the standards 1. On shaft 10, a sprocket wheel 13 is secured and is connected by a chain 14 with a sprocket wheel 15 on a conveyer shaft 16. The shaft 16 is supported at one end of parallel horizontal bars 17, and also in a rearwardly extending arm 18 on one of the standards 1. On the shaft 11, a sprocket wheel 19 is secured and is connected by a chain 20 with a sprocket wheel 21, the latter fixed to a conveyer shaft 22. This shaft 22 is supported in parallel horizontal bars 23, and also in a rearwardly extending arm 24 on one standard 1.

As seen clearly in Fig. 3, the arms 18 and 24 are in substantial parallelism and extend back to and are secured to the outside bars 17 and 23 respectively, so that a strong construction is had. Both soldering mechanisms are provided with these bars 17 and 23, but only the mechanism A is equipped with the power transmission means above described as it is necessary to drive the conveyers from one end only. The bars 17 and 23 constitute horizontal tracks on which the cans 25 are adapted to roll. Between the bars 17, an endless chain conveyer 26 is located and is driven by a sprocket wheel 27 on the shaft 16. Between the bars 23, a chain conveyer 28 is located and is driven by a sprocket wheel 29 on shaft 22. Both of these chain conveyers are provided with pins 30 which serve to space the cans apart and compel them to move along the bars. At opposite sides of the bars 17 and 23, I preferably erect fences or guides 31, which confine the ends of the cans and compel them to move in a straight line along the bars.

32 represents a can chute, down which the cans are fed by gravity and deposited one at a time on the bars 17 by means of a star wheel 33. The wheel 33 is provided with a pulley 34 which is connected by a crossed strap 35 with a pulley 36 on shaft 16.

On the shaft 4 of each soldering mechanism A and B, parallel disks 37 and 38 are located, the former located above the latter and of appreciably less diameter. The disk 38 is provided with bearing brackets 39 in which shafts 40 are mounted to turn and also moved longitudinally. The shafts 40 at their lower ends are provided with can clamping cups 41. I refer to these parts 41 as "cups" because they have annular beveled flanges 42 to engage the head or end of the can, and center the same with relation to the axis of the shaft 40. Coiled springs 43 are located around the shafts 40 between the bearings 39 and the cups 41, and exert pressure on the latter to normally hold the cans 25 in clamped position between said cups and disks 44, which are supported on short posts 45, the latter fixed to a hub 46 which is secured to the shaft 4.

It will be noted that the can clamps above referred to support the cans in a general inclined position which is an especially desirable position for receiving the application of solder as will more fully hereinafter appear. The can clamps are caused to revolve by means of pinions 47 which are fixed to the shafts 40 and mesh with a circular rack 48, the latter secured to the frame 2 and constituting a fixed part of the mechanism.

It will be noted particularly by reference to Fig. 2 that the teeth of the rack 48 are of an appreciable length greater than the width of the pinion 47, so that the pinion may move transversely of the rack and still be in perfect mesh therewith. This movement of the pinion is caused by the operation of the clamp to release a can and is effected through the medium of a cam 49. The cam 49 constitutes a band which is secured to arms 50 fixed to standard 1, and against the outer face of which collars 51 on shafts 40 engage. The cam 49 is of such a shape that throughout a path approximating one-half of the movement of each clamp, it will hold the clamp in open position. In other words, the cam will cause the shaft 40 to be moved longitudinally and release the can as shown at the left of Fig. 2. During the other movement of the cam, the cam will permit the clamp to operatively engage and hold the can as shown at the right of Fig. 2.

My invention is not limited to any particular number of can clamps on the soldering mechanisms. I have illustrated four, but it is to be understood that various different numbers and arrangements of clamps may be utilized in accordance with the size of the cans.

The disks 37 and 38 support vertical tubes 52 which constitute guides for wires 53 which are of what is known in the art as "self fluxing solder." Each wire 53 is provided with means for controlling the movement of the wire, and in Figs. 4, and 5, I illustrate on an enlarged scale one of these wire feeding mechanisms which is as follows: A box 56 is secured to the disk 37 and contains a drive wheel 57 which is preferably provided with an annular groove 58 to engage the wire 53 and in which groove, the wire is held by a spring-pressed roller 59. This roller 59 is mounted in a bifurcated bracket 60 having a threaded shank 61 projecting through the box. A nut 62 is screwed onto the shank 61, and a coiled spring 63 is located around the shank and exerts a pressure against the roller to insure a tight frictional engagement of the wire against the wheel 57. The wheel 57 is secured to a short shaft 64 which projects outside of the box, and has a beveled pinion 65 thereon. A ring 66 is supported on brackets 67 fixed to frame 2, and at one point on this ring, a beveled segmental rack 68 is located, so that as the different pinions 65 come in contact with the said segmental rack, they will be turned slightly to impart a downward movement to the wire as the latter is moved against the can. At other times the pinions 65 are stationary, as it is only necessary to move the soldering wire during the actual soldering operation. The length of the rack 68 will control the movement of the solder.

The shafts 4 are each hollow, at least in their lower portions, and into the hollow shafts, gas supply pipes 69 project. The gas pipes 69 are stationary and project up into the hollow shafts 4, so that while the latter are free to revolve around the pipes, there is no leakage of gas.

70 represents a gas tank or distributing chamber which is located around the shaft 4 and supported on the large beveled gear 7. This distributing tank 70 is connected by flexible pipes 71 with burners 72 on the upper ends of vertically movable rods 73. The rods 73 are carried by the gear 7, and mounted to move vertically therein. The burners 72 on the upper ends of the rods are adapted to direct a flame against the lower ends of the cans as they are supported by the clamps, and it is only during a portion of the movement that such direct heat is desired, so that the rods 73 are given a longitudinal movement to bring the burners close to the cans or to allow them to move downwardly from such position. This vertical movement is imparted by a stationary cam 74 fixed to table 5, and on which rollers 75 in the bifurcated lower ends of the rods 73 are mounted to run. As the gear 7 turns, it will, during a portion of its movement, through the medium of the cam 74, compel the burners 72 to move close to the cans, and it is to be understood that I provide a burner for each can clamp.

Gas burner tubes 76 are located beside the bars 17 and 23 to heat the ends of the cans as they are moved along these bars, and such burner tubes are connected by pipes 77 with a supply pipe 78 which also supplies pipe 69.

As above stated, the cans are supplied through the chute 32 onto the bars 17, and move along the bars 17 by the conveyer 26. This conveyer deposits the cans upon a track 79 which is of such a shape as to compel the cans to change their position from a horizontal to an angle, the change taking place gradually as the cans are moved along the track. At the extreme end of the track, spring arms 80 are projected from a rectangular housing 81, and said spring arms clamp the sides of a can after it is forced through the housing by the cans accumulating behind the same. The arms 80 grasp the sides only of the can, so that the ends of the can are free to be engaged by the clamps, and it is to be understood that the track 79 gives to the cans a proper incline so that they will be in position to be grasped by the can clamps as they approach the same in their open or expanded position. At the left of Fig. 2, I illustrate a clamp in this position to receive a can, and it is to be understood that as soon as the members of the clamp are at opposite ends of the can, the spring 43 will be permitted to operate and compel cup 41 to grip and center the can, carrying the can from between the arms 80 and allowing another can to be moved out into position for the next clamp. After the can is engaged by a clamp, it is carried around, and during such movement is revolved by reason of the fact that the pinion 47 is always in mesh with the rack 48. During this movement, the burner 72 will be elevated and direct the flame against the lower end of the can. At the proper time, the soldering wire will be lowered so that it contacts with the can and the head of the can will be effectually soldered. The remainder of the movement of the can permits the same to be cooled before it is dropped onto a track 82. The track 82 is located at the discharge point of the soldering mechanism B and is of general angle shape as shown clearly in Fig. 8. As the cans are received one at a time on the end of this track, the cans in front will be forced along the track by the new cans dropped on the track from the clamps.

By reference particularly to Fig. 8, it will be noted that the cans as they travel along the track are turned completely over. In other words, both walls of the angle shaped track change their angles, so that the can turns over, and as it assumes a horizontal position, will have the soldered end of the can outermost. In other words, the cans will be so positioned on the track 82 that their unsoldered ends will be moved along the inside of the conveyer 28 and receive the heat from the burner tube 76.

The receiving point of mechanism A is constructed precisely like the receiving point of mechanism B, so that the cans are presented to the can clamps of the mechanism A with their unsoldered ends lowermost ready to receive the solder. The cans from the mechanism A are dropped into a chute 83 which conveys the soldered cans away to any point desired.

While I, of course, do not limit the invention to any particular power transmitting means, I preferably employ a drive shaft 84 supported in brackets 85 and having beveled pinions 86 at its ends. These pinions mesh with beveled gears 88 on the shafts 4 and compel the mechanisms to operate in perfect unison. A pulley 89 is located on the shaft 84 and may be connected with any suitable source of power. As a supporting means for the bars 17 and 23, I preferably provide uprights 90 which are located between the mechanisms A and B and give to the structure a desirable rigidity.

The operation of the machine is as follows: The cans fed from chute 32 by the star wheel 33 are rolled along the bars 17 by the conveyer 26. During such movement, the cans at one end are heated by the burner tube 76. The pins 30 of the conveyer 26 force the cans along the track 79 out into position between the spring arms 80, and from these arms, the cans are removed by the clamps above described. During their movement by the clamps, the cans are revolved, their lower ends heated, and the solder applied. The cans are next dropped by the clamps onto the track 82, and I would call attention to the fact that the lower angle or base portion of the track is very narrow at the point of entrance, and the disk 44 of the can clamp is of less diameter than the can, so that this disk may freely pass the end of the track while the can is given a movement along the track before it is released, so that each succeeding can serves to move the line of cans along the track 82 until the cans are engaged in turn by the pins 30 of conveyer 28 and rolled by said conveyer along the bars 23, so that the ends of the cans which remain unsoldered are heated before they are passed to the soldering mechanism A. As above stated, this mechanism has an entrance track 79 precisely like that above described to present the cans to the clamps of mechanism B, and after the ends of the cans are soldered, they are dropped into the chute 83 and carried away. The operation therefore of soldering both ends of the can is entirely automatic, and each can will receive its proper amount of solder which will be uniformly applied to all the cans.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A can soldering machine comprising a frame, a vertical shaft supported in the frame, and a circular series of can clamps carried by the shaft, a table fixed to the frame below the series of clamps, a cam on the table, a relatively large gear fixed to turn with the shaft and located below the series of clamps and above the table, and a series of burners carried by the gear and movable by the cam toward and away from the can clamps, substantially as described.

2. A can soldering machine comprising a frame, a vertical shaft supported in the frame, and a circular series of can clamps carried by the shaft, a table fixed to the frame below the series of clamps, a cam on the table, a relatively large gear fixed to turn with the shaft and located below the series of clamps and above the table, a series of burners supported to move vertically through openings in the gear and at their lower ends engaging the cam, substantially as described.

3. A can soldering machine comprising a frame, a vertical shaft supported in the frame, and a circular series of can clamps carried by the shaft, a table fixed to the frame below the series of clamps, a cam on the table, a relatively large gear fixed to turn with the shaft and located below the series of clamps and above the table, a series of burners carried by said gear and movable by said cam to move said burners into proximity to the cans in the clamps, and means operated by said gear to feed the cans to the clamps, substantially as described.

4. A can soldering machine comprising a frame, a vertical shaft supported in the frame, and a circular series of can clamps carried by the shaft, a table fixed to the frame below the series of clamps, a cam on the table, a relatively large gear fixed to turn with the shaft and located below the series of clamps and above the table, a series of burners carried by the gear and movable by the cam toward and away from the can clamps, said shaft hollow throughout a portion of its length constituting a gas pipe, a gas chamber secured around the shaft and communicating with the interior thereof, and a series of flexible pipes connecting said chamber with the respective burners, substantially as described.

5. A can soldering machine comprising a frame, a vertical shaft supported in the frame, and a circular series of can clamps carried by the shaft, a table fixed to the frame below the series of clamps, a cam on the table, a relatively large gear fixed to turn with the shaft and located below the series of clamps and above the table, a series of burners supported to move vertically through openings in the gear and at their lower ends engaging the cam, said shaft hollow throughout a portion of its length constituting a gas pipe, a gas chamber secured around the shaft and communicating with the interior thereof, and a series of flexible pipes connecting said chamber with the respective burners, substantially as described.

6. A can soldering machine comprising a frame, a vertical shaft supported in the frame, and a circular series of can clamps carried by the shaft, a table fixed to the frame below the series of clamps, a cam on the table, a relatively large gear fixed to turn with the shaft and located below the series of clamps and above the table, a series of burners carried by said gear and movable by said cam to move said burners into proximity to the cans in the clamps, means operated by said gear to feed the cans to the clamps, said shaft hollow throughout a portion of its length constituting a gas pipe, a gas chamber secured around the shaft and communicating with the interior thereof, and a series of flexible pipes connecting said chamber with the respective burners, substantially as described.

7. A can soldering machine comprising a frame, a vertical shaft supported in the frame, and a circular series of can clamps carried by the shaft, a table fixed to the frame below the series of clamps, a cam on the table, a relatively large gear fixed to turn with the shaft and located below the series of clamps and above the table, a series of burners carried by the gear and movable by the cam toward and away from the can clamps, solder supports above the can clamps, a solder guide for each can clamp, means for feeding the solder downwardly when the can clamps reach a pre-determined position, and means for operating the clamps to grasp and release the cans, substantially as described.

8. A can soldering machine comprising a frame, a vertical shaft supported in the frame, a circular series of can clamps carried by the shaft, a table fixed to the frame below the series of clamps, a cam on the table, a relatively large gear fixed to turn with the shaft and located below the series of clamps and above the table, a series of burners supported to move vertically through openings in the gear and at their lower ends engaging the cam, solder supports above the can clamps, a solder guide for each can clamp, means for feeding the solder downwardly when the can clamps reach a pre-determined position, and means for operating the clamps to grasp and release the cans, substantially as described.

9. A can soldering machine comprising a frame, a vertical shaft supported in the frame, and a circular series of can clamps carried by the shaft, a table fixed to the frame below the series of clamps, a cam on the table, a relatively large gear fixed to turn with the shaft and located below the series of clamps and above the table, a series of burners carried by said gear and movable by said cam to move said burners into proximity to the cans in the clamps, means operated by said gear to feed the cans to the clamps, solder supports above the can clamps, a solder guide for each can clamp, means for feeding the solder downwardly when the can clamps reach a pre-determined position, and means for operating the clamps to grasp and release the cans, substantially as described.

10. A can soldering machine comprising a frame, a vertical shaft supported in the frame, and a circular series of can clamps carried by the shaft, a table fixed to the frame below the series of clamps, a cam on the table, a relatively large gear fixed to turn with the shaft and located below the series of clamps and above the table, a series of burners carried by the gear and movable by the cam toward and away from the can clamps, said shaft hollow throughout a portion of its length constituting a gas pipe, a gas chamber secured around the shaft and communicating with the interior thereof, a series of flexible pipes connecting said chamber with the respective burners, solder supports above the can clamps, a solder guide for each can clamp, means for feeding the solder downwardly when the can clamps reach a pre-determined position, and means for operating the clamps to grasp and release the cans, substantially as described.

11. A can soldering machine comprising a frame, a vertical shaft supported in the frame, and a circular series of can clamps carried by the shaft, a table fixed to the frame below the series of clamps, a cam on the table, a relatively large gear fixed to turn with the shaft and located below the series of clamps and above the table, a series of burners supported to move vertically through openings in the gear and at their lower ends engaging the cam, said shaft hollow throughout a portion of its length constituting a gas pipe, a gas chamber secured around the shaft and communicating with the interior thereof, a series of flexible pipes connecting said chamber with the respective burners, solder supports above the can clamps, a solder guide for each can clamp, means for feeding the solder downwardly when the can clamps reach a pre-determined position, and means for operating the clamps to grasp and release the cans, substantially as described.

12. A can soldering machine comprising a frame, a vertical shaft supported in the frame, and a circular series of can clamps carried by the shaft, a table fixed to the frame below the series of clamps, a cam on the table, a relatively large gear fixed to turn with the shaft and located below the series of clamps and above the table, a series of burners carried by said gear and movable by said cam to move said burners into proximity to the cans in the clamps, means operated by said gear to feed the cans to the clamps, said shaft hollow throughout a portion of its length constituting a gas pipe, a gas chamber secured around the shaft and communicating with the interior thereof, and a series of flexible pipes connecting said chamber with the respective burners, solder supports above the can clamps, a solder guide for each can clamp, means for feeding the solder downwardly when the can clamps reach a pre-determined position, and means for operating the clamps to grasp and release the cans, substantially as described.

In testimony whereof I have signed my name to this specification in the presence of two subscribing witnesses.

HENRY S. BECHTEL.

Witnesses:
 M. E. DITTUS,
 CHAS. E. POTTS.